May 5, 1964  W. E. STREETER  3,131,746
DEVICE FOR SPINNING BRANCHES ON PIPES
Filed Jan. 11, 1960  6 Sheets-Sheet 1

INVENTOR.
WALTER E. STREETER
BY
Charles L. Lovercheck
ATTORNEY

May 5, 1964

W. E. STREETER 3,131,746

DEVICE FOR SPINNING BRANCHES ON PIPES

Filed Jan. 11, 1960

INVENTOR.
WALTER E. STREETER

BY
Charles L. Lovercheck
ATTORNEY

May 5, 1964  W. E. STREETER  3,131,746
DEVICE FOR SPINNING BRANCHES ON PIPES
Filed Jan. 11, 1960  6 Sheets-Sheet 3

INVENTOR.
WALTER E. STREETER
BY
ATTORNEY

May 5, 1964 W. E. STREETER 3,131,746
DEVICE FOR SPINNING BRANCHES ON PIPES
Filed Jan. 11, 1960 6 Sheets-Sheet 4

INVENTOR.
WALTER E. STREETER
BY
ATTORNEY

May 5, 1964  W. E. STREETER  3,131,746
DEVICE FOR SPINNING BRANCHES ON PIPES
Filed Jan. 11, 1960  6 Sheets-Sheet 5

INVENTOR.
WALTER E. STREETER
BY
Charles L. Lovmheck
attorney

May 5, 1964  W. E. STREETER  3,131,746
DEVICE FOR SPINNING BRANCHES ON PIPES
Filed Jan. 11, 1960  6 Sheets-Sheet 6

WALTER E STREETER  INVENTOR.

BY Charles L. Lovestedt
attorney

United States Patent Office 3,131,746
Patented May 5, 1964

3,131,746
DEVICE FOR SPINNING BRANCHES ON PIPES
Walter E. Streeter, 4622 Sunnydale Blvd., Erie, Pa.
Filed Jan. 11, 1960, Ser. No. 1,558
10 Claims. (Cl. 153—21)

This invention relates to pipe spinning tools and, more particularly, to tools for forming a flange on the lateral side of a pipe such as a copper pipe or the like.

This application is a continuation in part of patent application, Serial No. 823,071, filed June 26, 1959, and constitutes an improvement thereover since the structure thereof is somewhat modified in the present invention.

The machine disclosed herein is referred to as a T-turner for purposes of identification only. In a generic sense, it might also be properly referred to as a pipe or tubing tool.

The T-turner is made up generally of a top housing and a clamp assembly. The clamp assembly is designed so that it can be readily clamped in a vise on a bench or power machine for shop use. It can also be expeditiously affixed to intermediate parts of a pipe to form the required branches after the pipe is installed and thus eliminate the use of the usual branch fittings and the laborious cutting and measuring usually incidental thereto. A locking mechanism on the clamp assembly prevents the top housing from inadvertently parting when used in overhead work and the like. This is an important safety feature.

The top housing may be readily unlocked from the clamp assembly for removal. The T-turner is made so it can also be used without locking the top housing and clamp assembly together. This adds convenience when it is used in an upright position. The T-turner is so constructed that the top housing, including all moving or threaded parts, is completely removed from the clamp assembly during the time that the hole to receive the spinning finger is being formed. This is an important feature because the hole may best be formed by machining operation, drilling, sawing, or a combination thereof.

The T-turner is so made that this machining operation can be done with the pipe clamped in position in the clamp assembly. This is in itself an advantage since the hole can be located and the hole drilled from the same set-up that the spinning operation is formed, thus retaining the center of rotation of the spinning finger concentric to the hole and thereby resulting in a uniform height of flange around the hole. Also, since the hole is machined while the top housing is removed, no foreign copper machine chips will fall on the threaded and other working parts of the clamp assembly. It is well known that copper chips have a tenacious affinity for iron parts and if they are allowed to deposit on the threaded members of the machine, the operation of the machine would be obstructed.

The open top of the clamp assembly provides access for deburring the hole. It is important to remove tool marks which would act as stress raisers and thus result in split tug, fracture, and failure of the formed flange.

Since the upper pipe support has its sides relieved and the top housing working parts are supported in spaced relation to the clamp assembly, a substantial access opening is provided between the parts of the T-turner at each side. These access openings allow the operator to observe the progress of the deformation of the pipe caused by the action of the spinning finger and may regulate, thus doing a better job. The openings also provide a convenient access to add supplemental lubricant to the spinning finger when required. This eliminates incorporating a lubricating means in the spinner.

Since the edges of the top of the upper pipe support are relieved, the spinning finger can be swung laterally during insertion into the pipe hole. It can be positioned in the top housing before the housing is assembled to the clamp assembly. Thus, the spinning finger can be inserted through a smaller pilot hole in the pipe. Since the walls of the branch are formed by the material outside the pilot hole, the smaller the hole, the more material remains around it and, therefore, the higher the flange resulting. The clearance at the top of the upper pipe support also makes it possible to insert a spinning finger which is disposed at more nearly right angular relation to the body of the finger. It is desirable for the finger to be disposed at approximately twenty-five degrees to the body of the finger in order for maximum efficiency of spinning to result.

In spinning branches at other than ninety degrees, the pilot hole may be formed at right angles to the pipe. It is virtually impossible to saw an accurate hole at other than ninety degrees to the pipe.

In addition to forming T's on pipe, crosses can also be formed on opposite sides of the pipe. Since the spinning assembly is interchangeable, only the clamp sizes need be changed to go from one size of pipe to another. The relation of the rotating members makes it possible to vary the ratio of the rate of lift to the rate of rotation of the finger during the various parts of the spinning operation.

In spinning heavy pipe, it has been discovered that it is extremely hard to rotate the spinning finger during the initial part of the spinning before the material to form the branch has raised substantially because the finger is engaging and moving a large amount of metal at that time. During the later stages of the spinning of the branch, the finger rotates much easier because it is moving less metal. The ratio of movement of the finger upward relative to the rotation thereof can be controlled by varying the rate of movement of the lift sleeve relative to the rotation of the spinning finger by utilizing a single wrench having engaging members for the spinning finger as well as the lift sleeve and rotating the lift sleeve intermittently. In order to overcome this inconvenience, a clutch mechanism is disclosed herein which will compensate for the difference in difficulty of rotation of the spinning finger. Such a clutch arrangement is disclosed in FIG. 14 herein.

The present application also discloses a spinning tool wherein a flange can be formed on a pipe at an angle to the axial flow of the material through the pipe.

It is, accordingly, an object of the present invention to provide an improved pipe branch forming machine.

Still another object is to provide a branch forming machine wherein a spinning member is provided along with a separable member to clamp the machine to a pipe.

A further object of the invention is to provide a machine as aforesaid wherein a hole locating device is separably attached to the clamp assembly.

Still a further object of the invention is to provide a machine as aforesaid wherein a pilot hole may be formed in a pipe with the spinning mechanism removed from the tool.

Yet a further object of the invention is to provide a machine as aforesaid which is made so as to have access or observation openings therein whereby the spinning operation and the spinning tool may be observed and lubricated.

It is another object of the invention to provide an improved driving mechanism for a spinning machine.

It is a further object of the invention to provide a machine having a unitary driving mechanism with means thereon to control two functions of the machine.

Still a further object of the invention is to provide a spinning machine made so that the tool may be inserted in the work in an improved manner.

Yet another object of the invention is to provide a pipe branch forming machine which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
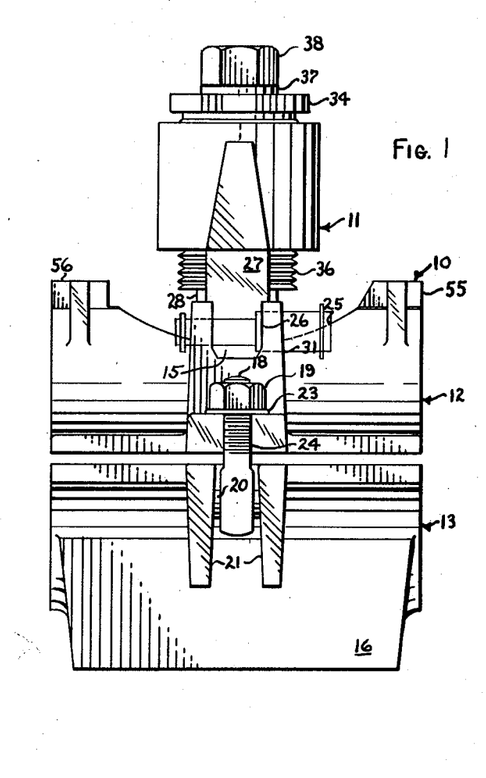
FIG. 1 is a side view of a spinning tool according to the invention.
Figure 2:
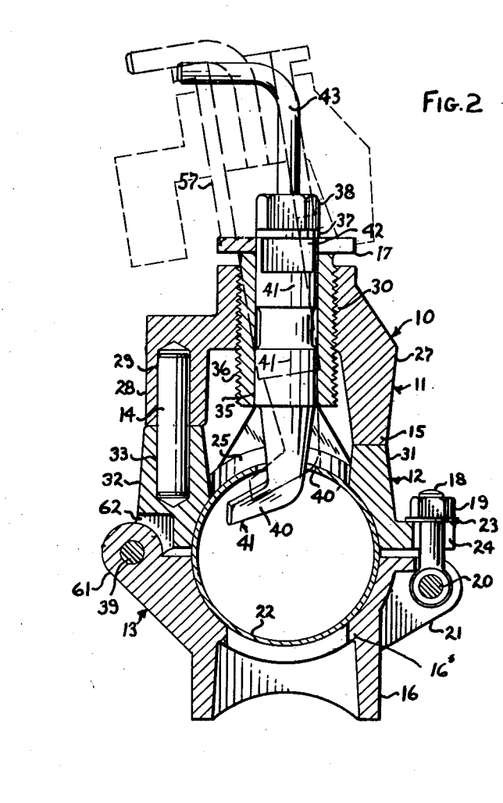
FIG. 2 is a cross sectional view taken on line 2—2 of FIG. 3.
Figure 3:
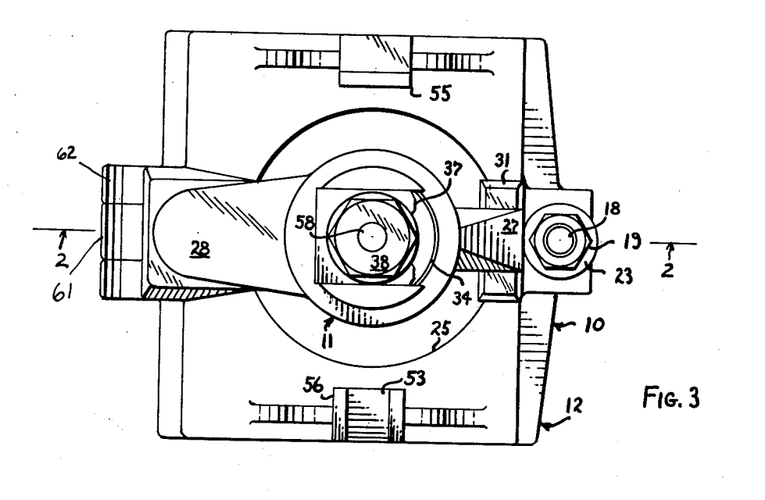
FIG. 3 is a top view of the spinning tool shown in FIGS. 1 and 2.

Now with more specific reference to the drawings, in FIGS. 1, 2 and 3, a tool is shown which is referred to generally herein as a T-turner for forming a branch on a straight pipe such as a pipe 22 made of spinnable material such as copper or other material which may be suitably worked.

A T-turner 10 is made up principally of a lift housing 11 including its associated finger, and a clamp assembly made up of an upper pipe support 12 and a lower pipe support 13 swingably connected together with a space for receiving a pipe therebetween and a support means for the separable lift housing 11.

The lower pipe support 13 has a base 16 in the form of a box which may be clamped in a vise and the entire unit 10 may thus be supported on a bench or the like. The base 16 has an opening 16' therein through which one branch of a pipe may etxend while an opposite branch is being formed, thus making it possible to form diametrically opposite branches on the pipe. Integral with the base 16 and extending upwardly and outwardly therefrom is an ear 61 which serves as part of a hinge for connecting the upper pipe support 12 to the lower pipe support 13.

An eye bolt 18 is pivotally connected between spaced lugs 21 on the lower pipe support 13 by a pivot pin 20 which extends through aligned holes in the lugs 21 and through the eye of the eye bolt 18. The internal surface of the lower pipe support 13 is complementary in shape with the lower portion of the outside surface of the pipe 22.

The upper pipe support 12 has a surface complementary in shape with the lower surface of the pipe 22 and may engage a diametrically opposite part of the pipe from that engaged by the support 13. The supports 12 and 13 are further hinged together by spaced lugs 62 formed on the lower edge of the support 12 which receive a lug 61 between them. Both the lugs 61 and 62 are bored with aligned holes to receive hinge pins 39. Spaced ears 24 are formed on the upper pipe support 12. The threaded end of the eye bolt 18 is received between the ears 24. A nut 19 is threadably received on the eye bolt 18 with a washer 23 thereunder. The nut 19 may be tightened to clamp the pipe 22 between the upper and lower supports 12 and 13.

The upper pipe support 12 has an opening 25 formed therein through which the flaring finger can operate and through which the spun branch can be formed.

A boss 31 is integral with the support 12 and a slot 26 is formed in the boss 31. An integral boss 32 is formed on the opposite side of the opening 25 from the boss 31. The lift housing 11 is supported on the bosses 31 and 32. The lift housing 11 has a bored threaded body with spaced legs 27 and 28 thereon.

The legs 27 and 28 rest on the bosses 31 and 32, respectively. The boss 32 is bored at 33 to slidably receive a locating pin 14. The leg 28 has the upper end of the locating pin 14 pressed into a bore 29. Thus, the locating pin 14 restrains the lift housing 11 against lateral sliding on the upper support 12. The leg 15 is integral with the leg 27 and is received in the slot 26 formed in the boss 31. The locating pin 14 and the key 15 position the support 12 over the opening in the upper pipe support 12. It will be noted that the lift housing 11 may be readily removed from the upper support 12 and that there is a substantial opening between the lift housing 11 and the upper support 12 at each side. This provides a space through which, in the spinning operation, a person may lubricate the tool.

The lift housing 11 has internal threads 30 which receive a lift sleeve 34 externally threaded at 36. The lift sleeve 34 has a central axial bore 35 which will receive a spinning finger 41. The finger 41 has diametrically spaced recesses 42. The recesses 42 receive the spaced legs of a C-washer 37. The C-washer 37 is received in the recesses 42 and rests on a shoulder 17 in position in the sleeve 34 during the spinning operation. An uppermost portion 38 of the finger 41 is hexagonal shaped. A threaded hole 58 in the finger 41 receives a handle pin 43 used when assembling the device on a pipe.

The position of the finger 41 and the sleeve 34 during assembly is shown in FIG. 2. On small size pipe, bearing surfaces 41' will be larger than a pilot hole 40' so the finger 41 may be inserted in the pilot hole 40' prior to assembly of the finger 41 in the lift sleeve 34. The bearing surfaces 41' will prevent the finger 41 from falling into the pipe. On larger sizes of pipe, the finger 41 will be extended through the lift support with the C-washer 37 removed as shown in phantom lines in FIG. 2. The finger 41 can thus be inserted in the pilot hole 40' with the lift support inclined to be received in the lateral space between the bosses 31 and 32. This will allow the lift support to incline to a greater extent and allow the point of the finger 41 to enter the pilot hole 40'. The operator can then move the lift support to its operative position by means of the handle pin 43, pull the finger 41 into its operative position, and insert C-washer 37.

Figure 4:
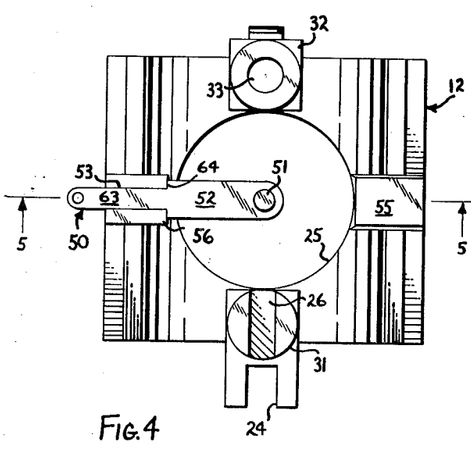
FIG. 4 is a top view of the spinning tool with a center punching arm supported thereon.
Figure 5:
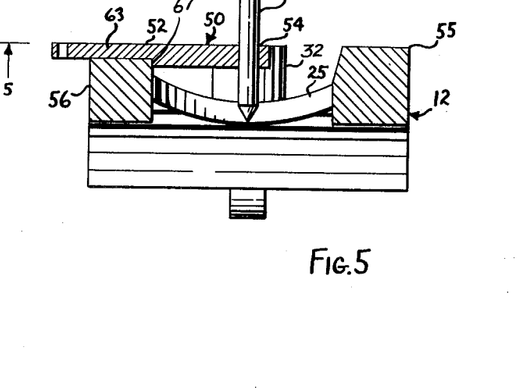
FIG. 5 is a partial cross sectional view taken on line 5—5 of FIG. 4.

FIGS. 4 and 5 show a punch 50 for center punching the pipe to locate a pilot hole in the pipe to be spun. The punch 50 has a locating arm 52 to be received in a slot 53 in a boss 56. A shoulder 67 rests against the inside of the boss 56 to positively locate a punch 51. The punch 51 is received and fixed in a hole 54 in the arm 52.

The punch is threaded so that it can be moved in and out so that it may remain perpendicular to the axis of smaller or larger size pipe. It is of vital importance that the pilot hole 40' be precisely centered relative to the bosses 31 and 32 because if the pilot hole 40' is not located eccentric to the center of the finger 41, the resulting flange will be higher on one side than the other. There is also the possibility of cracking of the flange on the higher side thereof.

Figure 6:
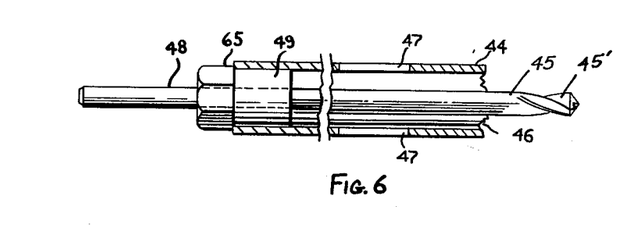
FIG. 6 is a cross sectional view of a drill and saw combination attachment to be used with the spinning tool disclosed herein.

A hole saw for cutting a hole for receiving a finger 60 in the pipe to be spun is shown in FIG. 6. The hole saw has a hollow cylindrical saw portion 47 which may be sweated to a cylindrical portion 49 integral with a nut 65. The nut 65 will have a bore therethrough to receive a cylindrical guide rod 48. The rod 48 extends outwardly from the nut 65 and may be chucked in a drill. An end 45 has drill flutes 45' which are sharpened to form a drill bit for drilling a pilot hole. This cylindrical end above the flutes 45' will guide the rod 48 into the pilot hole in the pipe to be spun.

In operation, a pipe is inserted between the top and bottom supports 12 and 13 and the supports 12 and 13 are swung together and locked by the eye bolt 18. Thus, the pipe is rigidly clamped in place by the clamp assembly. With the lift housing 11 removed, a member 63 of the center punch 50 is inserted in a notch 53 as shown in FIGS. 4 and 5 with the shoulder 67 abutting inside of the boss 56 to positively locate it. In this position, the punch 51 is adjusted so that the point on the punch 51 will engage the top surface of the pipe with the punch perpendicular thereto. By means of a hammer, the operator can center punch a locating hole on the pipe. Then a hole may be drilled by inserting the outer end of the rod 48 into an electrical drill or the like. The cylindrical rod 48 shown in FIG. 6 will follow the drill through the hole just drilled. The sawed slug will remain on the guide rod above the flutes 45'.

When forming small flares, a pilot hole will be sawed which is smaller in diameter than the diameter of bearing surfaces 41'' on the finger 41. Thus, the finger 41 may be inserted in the sawed hole and the bearing surfaces 41'' will rest on the marginal edges of the hole and thus keep the finger from falling through the sawed hole into the pipe. A finger which had fallen through such a hole in a pipe line would present a serious problem, especially on vertical runs of pipe since the finger can be inserted as aforesaid. The finger 41 can be made much more nearly perpendicular to its shaft and thus at a more nearly optimum angle for spinning than if it had to be inserted with the lift assembly in place on the T-turner. The optimum angle has been found to be twenty degrees but an angle of between fifteen and thirty degrees has been found satisfactory. It is also important to hard chrome plate the tool top and provide a boss 41a on the point at the side thereof. It is also important that the radius of curvature of the finger be approximately one-eighth inch.

In forming branches of larger diameter, the upper and lower supports 12 and 13 are first clamped in place and the pilot and sawed holes are formed. The sawed hole could be formed by any other suitable cutting or spinning means within the scope of the invention. The lift sleeve 34 is then rotated to threadably move it to its innermost position in the lift housing 11. The finger 41 is inserted in the bore in the lift sleeve 34 and the handle pin 43 affixed thereto. The finger 41 is moved as far down as possible and to yet allow the operator to retain control of the handle pin 43.

In this way, the lift assembly can be moved to the position shown in FIG. 2 and the lift housing 11 can be maneuvered laterally to allow a straight part 40 of finger 41 to enter the sawed hole parallel to a radius of the pipe. Then the lift assembly can be rotated or swung to its operative position with the straight part 40 underlying the marginal edges of the sawed hole. Thus, a much smaller hole can be used and a much higher branch results than could be used if the finger 41 and the lift assembly were fixed together or if the lift assembly and the top clamp were inseparable.

Another advantage of the separable lift assembly is that the threaded parts and relatively movable parts may be kept away from the copper chips resulting from sawing and drilling while these operations are taking place. It is well known that copper chips will tenaciously adhere to and interrupt the operation of relatively moving iron parts.

After the finger 41 is inserted and the upper and lower supports 12 and 13 are properly clamped in position on the pipe, the finger 41 may then be moved upwardly to bring the slots 42 above the upper surface of the lift sleeve 34 with the finger 41 inside the pipe. Then the C-washer 37 may be put in place and the operator can grasp the portion 38 with a suitable wrench. He may then rotate the lift sleeve 34 and the finger 41 together to move the finger 41 outwardly. As the sleeve rotates, the inner upper surface of the finger 41 will engage the inner periphery of the pipe around the opening 40' and spin the material thereof outwardly to form a smooth uniform branch on the copper pipe.

Figure 7:
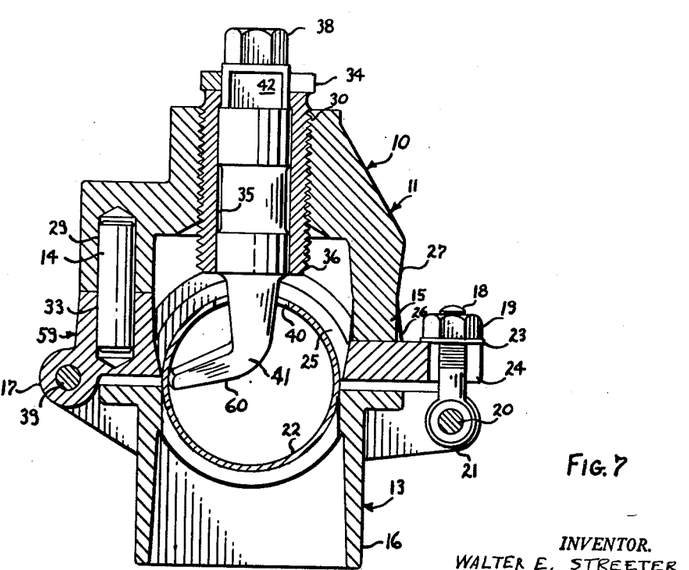
FIG. 7 is a cross sectional view similar to FIG. 2 showing a spinning tool for spinning a large size branch.
Figure 8:
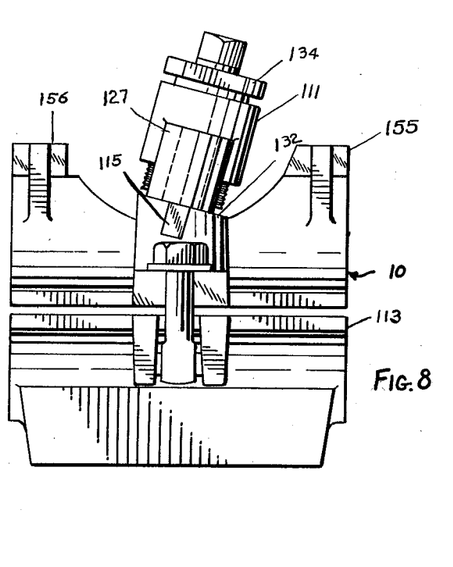
FIG. 8 is a side view of the tool showing another embodiment of the spinning member for forming an angle branch.

FIGS. 7 and 8 show the same T-turner as shown in FIGS. 1 and 2; however, in this case, the tool is suitable to form a larger flared branch on the pipe and, therefore, the finger 41 is larger than the finger shown in FIG. 2.

Figure 9:
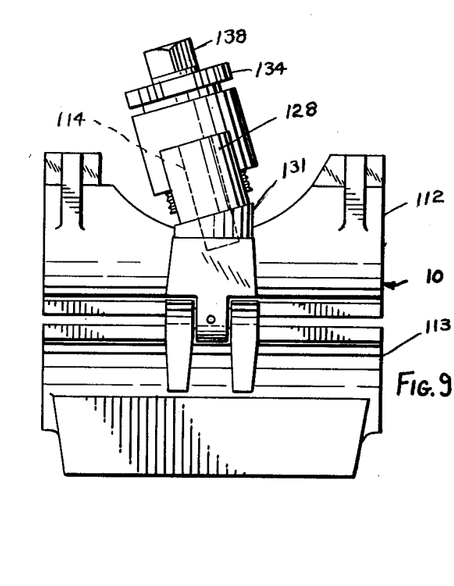
FIG. 9 is a view of the opposite side of the tool from that shown in FIG. 8.

In the embodiment of the invention shown in FIGS. 8 and 9, the top support and bottom support will be substantially identical to those shown in the other figures of drawing; however, the top surfaces of bosses 131 and 132 are slanted in one direction at the same angle as the central axis of the branch opening is to be disposed to the central axis of the pipe to be flared. A locating pin 114 is pressed into a leg 128 and is received in a bore in the boss 131. A tongue 115 is supported on the lower end of a leg 127. This supports the body of a lift sleeve 111. A top support 112 and a bottom support 113 are hinged together in exactly the same manner as in the embodiment of FIGS. 1 and 2. A lift housing 134 and its associated parts 128 and 138 are shown in the other embodiments. Therefore, the lift housing of all the embodiments shown may be made interchangeable, thus reducing the number of required parts in a complete set of the tools.

It has been discovered that by locating the lift sleeve 111 as shown in FIGS. 8 and 9 as described, the branch can be spun onto the tubing at an angle to the axis of the tubing.

Figure 12:
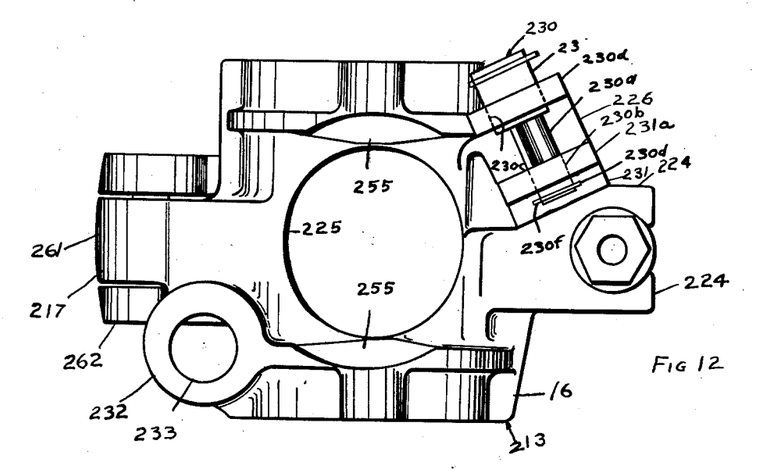
FIG. 12 is a top view of another embodiment of the spinning tool.
Figure 13:
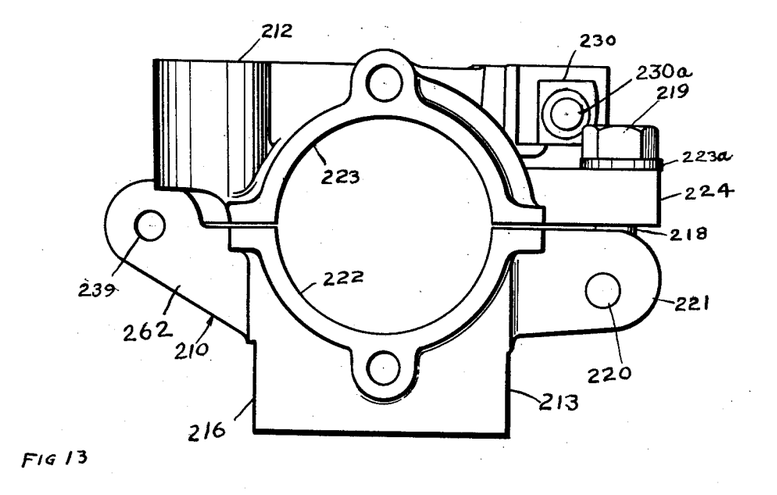
FIG. 13 is a side view of another embodiment of the spinning tool.

FIGS. 12 and 13 show another embodiment of the invention generally indicated at 220. Upper and lower pipe supports 212 and 213 and the lift assembly to be used therewith are substantially identical to the upper and lower pipe supports shown in the other embodiments of the invention disclosed herein. The lower pipe support 213 has a base 216, lugs 221 and 262, a pin 239, a nut 219, and a washer 223a which are similar to those shown in the other figures but for use on smaller pipes. The upper pipe support 212 is swingably attached to the lower pipe support 213 by the pin 239.

An eye bolt 218 is pivotally connected to the spaced lugs 221 on the lower pipe support 213 by means of a pivot pin 220. An internal surface 222 of the lower pipe support 213 and the internal surface 223 of the upper pipe support 212 are complementary with the lower part and the upper part, respectively, of a pipe on which a branch is to be formed. The supports 212 and 213 may engage diametrically opposite parts of such a pipe in order to hold it in clamped position while it is being flared. The supports 212 and 213 are further hinged together by the spaced lugs 262 formed on the lower edge of the support 212 which receive lugs 261 therebetween. The lugs 261 and 262 are bored to receive the hinge pin 239. The spaced lugs 221 are integrally attached to the lower support 212 on the opposite sides thereof from the lugs 261 and 262.

The eye of the eye bolt 218 receives the pin 220. The threaded end of the eye bolt 218 is received between ears 224 which are integral with the upper support 212. The nut 219 is threadably received on the eye bolt 218 with a washer 223a between the nut 219 and the upper side of the ears 224.

The upper pipe support 212 has an opening 225 formed therein which may receive a flaring finger such as disclosed in the other embodiments of the invention and into which a flared branch can be drawn during the forming operation.

A boss 231 is integral with the support 212 and has a slot 226 formed therein. An integral boss 232 is formed on the opposite side of the opening 225 from the boss 231. A guide casting similar to the housing 11 in the other embodiment may be supported on the bosses 231 and 232. The guide casting which may be supported thereon will be made in the form shown.

It will be noted that the bosses 231 and 232 are spaced diametrically from each other relative to the opening 225 and are displaced several degrees to the circumference of the opening 225 from the lugs 261 and from the ears 224. This makes it possible to utilize the same housing 11 for this small size fixture as is used in the other embodiments shown. The legs of the guide casting to be used correspond to the legs 27 and 28 of the other embodiments. The legs are adapted to rest on the boss 232. The boss 232 is bored at 233 to receive the locating pin 14 of the housing 11. The key 15 of the guide casting will be received in the bore 233 in the boss 232. The key 15 may be bored to receive a bolt 230.

The bolt 230 has an enlarged size portion 230' and a reduced size portion 230a. The reduced size portion 230a is received in a bore 230b in an ear 231a and the enlarged size portion 230' is received in a bore 230c in an ear 230d. A spring washer 230f is received in a groove in the portion 230a and a spring washer 230g is received in a groove in the enlarged portion 230'.

A tongue 215 which corresponds to key 15 in FIG. 1 is received in the slot in the boss 231. The bolt 230 must be in the position shown in FIG. 12 for the tongue 215 to be inserted. The reduced size portion 230a passes through a reduced size entrance part 230k of the slot and is received in an enlarged cylindrical bore 230L. Since the diameter of the enlarged portion 230' is greater than the width of the reduced size part 230k of the slot, the tongue 215 is held in position and, with it, the lift housing.

In other respects, the guide to the device shown in this embodiment is similar to that shown in the other embodiments.

If the boss were formed over the hinge on small sizes and the same lift assembly were used, the boss would interfere with the hinge. By making the boss offset from the hinge, the boss is moved from the hinge and, therefore, the boss does not interfere with the hinge when the same lift assembly is used as is used with the other larger size tools.

Figure 14:
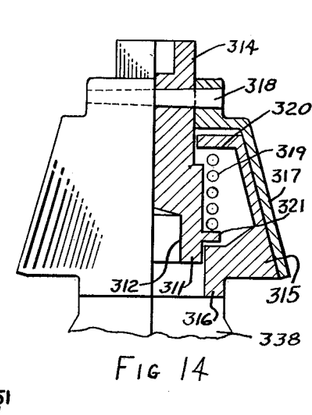
FIG. 14 is a partial cross sectional view of a driving device for the tool.
Figures 15, 16, 17:
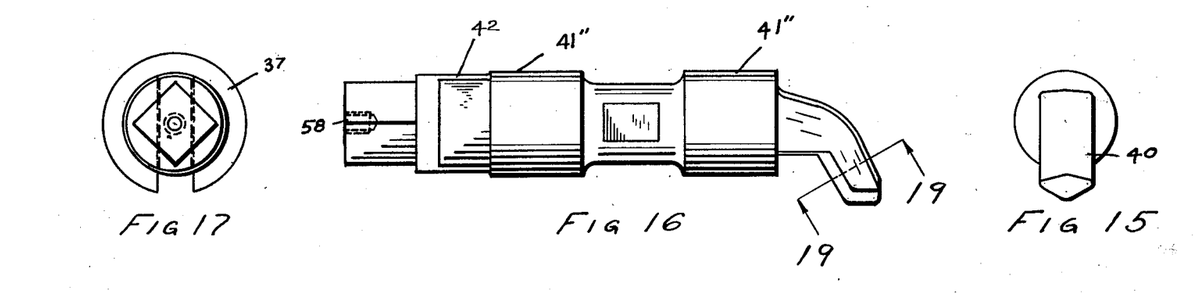
FIGS. 15, 16, 17 and 18 are enlarged views of one embodiment of the spinning member.
Figure 18:
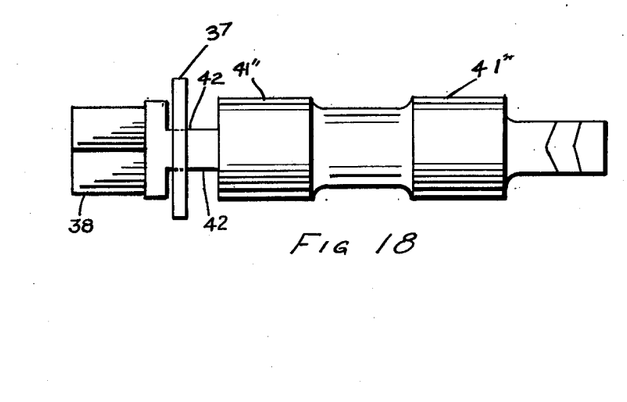
Figure 19:
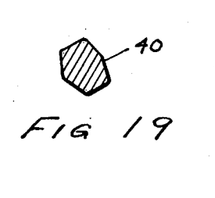
FIG. 19 is a cross sectional view taken on line 19—19 of FIG. 16.
Figures 20, 21:
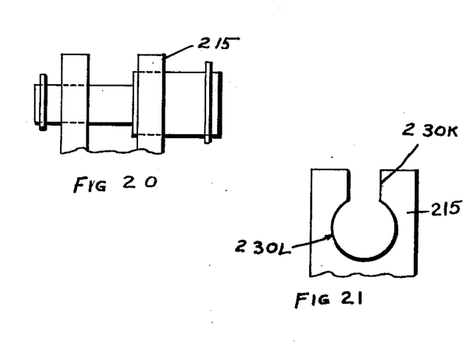
FIG. 20 is an enlarged view of the slotted boss of the device shown in FIG. 12.
FIG. 21 is a view of the tongue of a lifting housing for use with the device shown in FIG. 12.

The clutch arrangement has an inside wrench portion 311 bored at the lower end at 312 to fit over a non-circular part or pin 318 of the spinning finger and having an upper shank 314 for receiving a suitable wrench. A lower wrench portion 315 has spaced lugs 316 thereon for engaging corresponding lugs on the lift sleeve of the spinning member such as 134.

A clutch is provided for connecting the lower wrench portion 315 to the upper wrench 311. This is accomplished by two concentric conical clutch members 317 and 315'. The outside clutch member 317 is fixed to rotate with the shank 314 by the pin 318 which extends through both the outer clutch 317 and the shank 314.

The inner clutch 315' has an outer surface which conforms generally to the frustum of a cone and the outer clutch 317 has an inner surface which is frusto-conical shaped and generally complementary in shape to the outer surface of the inner clutch 315'. These two surfaces are held in intimate contact by a spring 319. The spring 319 is a compression type spring and it engages an inwardly directed flange 320 on the inner clutch member 315' at its upper end and engages a flange 321 on the lower end of the wrench 311, thus forcing the two clutch members together. The spring 319 will be selected of a proper strength to provide the proper frictional force between the inner and the outer clutch members. Therefore, when the operator grasps the shank 314 and the wrench and rotates it, it will positively rotate the spinning finger and, during the initial stages of forming the branch when the rotational force on the lifting sleeve is great, there will be a slippage between the outer clutch member and the inner clutch member which will cause a lesser component of force to rotate the finger and, therefore, make the sum of the force on the inner clutch 315' and on the shank 314 have a practical maximum value determined by the strength of the spring 319.

Figures 10, 22, 23:
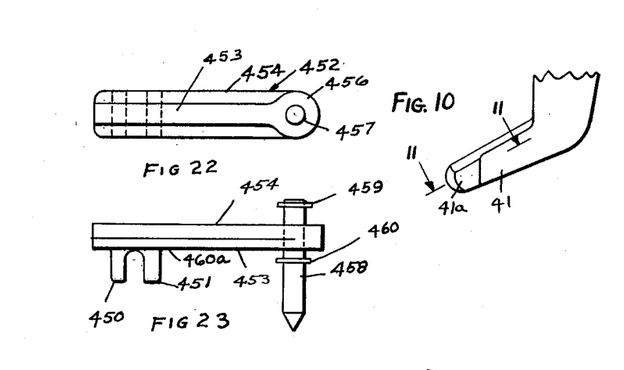
FIG. 10 is a partial enlarged view of one embodiment of the spinning finger for use with the tool shown in FIGS. 8 and 9.
FIGS. 22 and 23 show other embodiments of the punch for use with the embodiments of FIG. 12.
Figure 11:
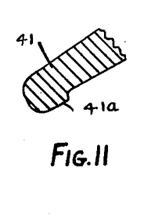
FIG. 11 is a cross sectional view of a spinning finger taken on line 11—11 of FIG. 10.

FIGS. 10 and 11 show another embodiment of the center punch for use with the embodiment of the invention shown in FIGS. 12 and 13.

The punch has a body 452 adapted to be supported on an upper pipe support like that shown in FIGS. 12 and 13 with the bolt 230 received in the slot between integral lugs 450 and 451. The body 452 is T-shaped in cross section having a flange 453 with a leg 454 integral therewith. The leg 454 terminates at one end in a boss 456 with a bore 457 therein. A sliding pin 458 is slidably received in the bore 457. It may slide between the limits fixed by C-shaped spring washers 459 and 460 each disposed in peripheral slots in the pin 458.

This punch is especially suitable for center punching pipes of several diameters which may be flared by the tool, especially when hollow cylindrical adapters are used with the tool such as those shown in the said parent application.

In use, a flat outside surface 460a rests on the top of the boss 231 and is thereby held parallel to the axis of the pipe. The pin 458 may then slide in the bore 457 until its point engages the pipe. The pin may then be struck to center punch the pipe preparatory to drilling the pilot hole.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed and defined as follows:

1. A device for forming a branch on a pipe comprising an upper support and a lower support connected together, means to clamp said upper support and said lower support onto a pipe, an opening in said upper support, two bosses on said upper support, one on each side of said opening, a bore in one said boss and a groove in the other said boss, a lift housing having a pin therein disposed in said bore and a key on the other side of said lift housing received in said groove, a threaded opening in said lift housing, a threaded lift sleeve received in said threaded opening, a central axial bore in said lift sleeve, a finger having a groove therein, said finger being disposed in said axial bore in said lift sleeve, and means in said groove supported on said lift sleeve for effecting outward movement of said finger with said lift sleeve.

2. The device recited in claim 1 wherein said bosses on said upper support have a top surface disposed at an angle to the axis of the pipe supported between said supports and the axis of said lift sleeve and said finger is disposed at less than a ninety degree angle to the axis of said pipe.

3. A device for forming a branch on a pipe comprising an upper member and a lower member connected together at a hinge connection and adapted to receive a pipe therebetween, a boss member on said upper member spaced laterally from said hinge connection, a lift member supported on said boss member, said lift member having a threaded bore therein, a threaded lift sleeve received in said threaded bore, a bore in said threaded lift sleeve concentric with said threads on said lift sleeve, and a spinning finger having a cylindrical portion, said lower member having an opening through the lower portion thereof diametrically opposite said lift member to receive a branch on said pipe.

4. A pipe machine comprising an upper support and a lower support, said upper support and said lower support being connected together, means to lock said upper and lower supports together to receive a pipe therebetween, an opening in said lower support to receive a branch on said pipe, an opening on said upper support to receive a branch being spun on said pipe, a lift housing, spaced legs on said lift housing, locating means locating said lift housing legs on said upper support, a spinning finger, means supporting said spinning finger on said lift housing, means to move said spinning finger radially outwardly and a radially disposed finger having a contoured upper surface attached to said spinning finger and adapted to extend through a hole in said pipe, said radially disposed finger being rotatable about an axis perpendicular to the central longitudinal axis of said pipe.

5. The machine recited in claim 4 wherein said lift housing is supported a substantial distance from said pipe, leaving a substantial opening between said upper support and said lift housing.

6. The machine recited in claim 5 wherein a boss extends downwardly from said lower clamp for receiving in a vise or the like.

7. A device for forming a branch on a pipe comprising an upper member and a lower member connected together, an opening in said upper member, two bosses on said upper member, one on each opposite side of said opening, a lift housing, spaced legs on said lift housing, said legs resting on said bosses, a slot in one said boss and an opening in the other said boss, a key on one said leg received in said slot, a locating member on the other said leg received in said opening, a spinning finger disposed in said lift housing, means to move said finger upwardly, and means to rotate said finger, said finger adapted to move material on a pipe surface received between said upper and lower member.

8. The device recited in claim 7 wherein a bolt means is provided to urge the walls of said slot together to lock said key therein.

9. The device recited in claim 7 wherein said lift housing has a threaded sleeve therein and said finger is removable therefrom.

10. The device recited in claim 7 wherein additional bosses are formed adjacent said opening on said upper member and means is provided on said additional boss to support an arm member with a hole locating punch thereon.

References Cited in the file of this patent

UNITED STATES PATENTS

| | | |
|---|---|---|
| 1,468,662 | Gifford | Sept. 25, 1923 |
| 1,476,765 | Junkers | Dec. 11, 1923 |
| 1,669,862 | Christianson et al. | May 15, 1928 |
| 1,765,704 | Schultis | June 24, 1930 |
| 1,855,602 | Kerner | Apr. 26, 1932 |
| 1,998,653 | Briegel | Apr. 23, 1935 |
| 2,345,123 | Holmes et al. | Mar. 28, 1944 |
| 2,417,638 | Egowin | Mar. 18, 1947 |
| 2,570,055 | Gasdia | Oct. 2, 1951 |
| 2,638,762 | Rayner | May 19, 1953 |
| 2,736,949 | Kraemer | Mar. 6, 1956 |
| 2,819,697 | Kraemer | Jan. 14, 1958 |
| 2,890,737 | Cleaver et al. | June 16, 1959 |
| 2,962,079 | Wilson | Nov. 29, 1960 |
| 3,050,102 | Hock | Aug. 21, 1962 |

FOREIGN PATENTS

| | | |
|---|---|---|
| 264,681 | Great Britain | Jan. 27, 1927 |
| 671,275 | Great Britain | Apr. 30, 1952 |